United States Patent
Mueller et al.

(10) Patent No.: US 6,449,533 B1
(45) Date of Patent: Sep. 10, 2002

(54) THERMOSTAT AND METHOD FOR CONTROLLING AN HVAC SYSTEM WITH REMOTE TEMPERATURE SENSOR

(75) Inventors: Carl J. Mueller; Bartholomew L. Toth, both of St. Louis, MO (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 09/579,115

(22) Filed: May 25, 2000

(51) Int. Cl.[7] .................. G01M 1/38; G05D 23/12; G05D 23/00; G05B 13/00; G05B 15/00; G05B 21/00

(52) U.S. Cl. ................ 700/276; 700/300; 236/91 D; 236/91 F

(58) Field of Search ............... 700/276, 277, 700/278, 300, 301; 236/91 R, 91 D, 91 E, 91 F, 91 G, 99 C, 99 E, 101 B, 9 R, 9 A, 51; 702/99, 130

(56) References Cited

U.S. PATENT DOCUMENTS

| | | | |
|---|---|---|---|
| 4,298,946 A | | 11/1981 | Hartsell et al. |
| 4,587,403 A | * | 5/1986 | Shapess ...................... 219/209 |
| 5,107,918 A | | 4/1992 | McFarlane et al. |
| 5,203,497 A | | 4/1993 | Ratz et al. |
| 5,361,982 A | | 11/1994 | Lieble et al. |
| 5,485,954 A | | 1/1996 | Guy et al. |
| 5,566,879 A | | 10/1996 | Longtin |
| 5,595,342 A | | 1/1997 | McNair et al. |
| 5,603,451 A | | 2/1997 | Helander et al. |
| 5,635,896 A | | 6/1997 | Tinsley et al. |
| 6,116,512 A | * | 9/2000 | Dushane et al. ............ 236/49.3 |
| 6,213,404 B1 | * | 4/2001 | Dushane et al. ............... 236/47 |
| 6,241,156 B1 | * | 6/2001 | Kline et al. ................. 700/276 |
| 6,290,140 B1 | * | 9/2001 | Pesko et al. ................. 181/175 |
| 6,385,510 B1 | * | 5/2002 | Hoog et al. ............ 379/102.05 |

\* cited by examiner

Primary Examiner—Leo Picard
Assistant Examiner—Ryan Jarrett
(74) Attorney, Agent, or Firm—Harness, Dickey & Pierce, P.L.C.

(57) ABSTRACT

A thermostat adapted to be connected to a climate control system for operating the climate control system. The thermostat comprises a main unit having a microprocessor, a keypad connected to the microprocessor for operating the thermostat, and a sub-base. The sub-base is adapted to communicate with at least one remote temperature sensor and provide information from the remote temperature sensor to the microprocessor. The sub-base comprises either a first sub-base assembly or a second sub-base assembly. The first sub-base assembly is adapted for connection to the remote temperature sensor via a wire lead. The second sub-base assembly has a receiver adapted for wireless communication with the remote temperature sensor. The main unit is releasably connectable to the sub-base in a manner so that when the main unit is connected to the sub-base, the main unit is adapted to receive from the sub-base the information from the remote temperature sensor regardless of whether the sub-base constitutes the first sub-base assembly or the second sub-base assembly.

15 Claims, 3 Drawing Sheets

THERMOSTAT AND METHOD FOR CONTROLLING AN HVAC SYSTEM WITH REMOTE TEMPERATURE SENSOR

BACKGROUND OF THE INVENTION

This invention relates generally to thermostats adapted for communicating with remote temperature sensors and methods of using remote temperature sensors in conjunction with thermostats.

Thermostats are generally attached to walls inside buildings for controlling heating and cooling systems of the buildings. Some thermostats have displays and keypads. The displays are adapted to display information, such as temperature of the room, thermostat settings, time of day, and programming information. The keypad enables a user to input signals to the thermostat to change thermostat settings or to alter the display. Some conventional thermostats are configured for communicating with temperature sensors which may be in locations remote from the thermostats (e.g., in another room). Certain of these thermostats communicate with remote temperature sensors via hard wire connections, while others communicate via wireless connections (e.g., RF connections).

A disadvantage of such conventional thermostats used with remote sensors is that they are either configured for operating with hard-wired sensors only, or with wireless sensors only. Thus, if hard-wired sensors are desired, one type of thermostat must be employed, and if wireless sensors are desired, another type of thermostat must be employed.

SUMMARY OF THE INVENTION

The present invention overcomes the disadvantages of the prior art thermostats. Among the advantages of the present invention may be noted the provision of a thermostat adapted for operating with hard-wired temperature sensors and wireless temperature sensors; the provision of such a thermostat having a main unit which contains various components common to different thermostat applications and a sub-base that contains components unique to certain thermostat applications; the provision of such a thermostat in which the main unit is adapted for communicating with the sub-base regardless of whether the sub-base is connected to a remote temperature sensor via a hard wire connection or via wireless communication.

In general, a thermostat of the present invention is adapted to be connected to a climate control system for operating the climate control system. The thermostat comprises a main unit having a microprocessor, a keypad connected to the microprocessor for operating the thermostat, and a sub-base. The sub-base is adapted to communicate with at least one remote temperature sensor and provide information from the remote temperature sensor to the microprocessor. The sub-base comprises either a first sub-base assembly or a second sub-base assembly. The first sub-base assembly is adapted for connection to the remote temperature sensor via a wire lead. The second sub-base assembly has a receiver adapted for wireless communication with the remote temperature sensor. The main unit is releasably connectable to the sub-base in a manner so that when the main unit is connected to the sub-base, the main unit is adapted to receive from the sub-base the information from the remote temperature sensor regardless of whether the sub-base constitutes the first sub-base assembly or the second sub-base assembly.

Another aspect of the present invention is a method of controlling an HVAC system. The method comprises providing a main unit of a thermostat, a first sub-base, and a second sub-base. The main unit has a microprocessor and a keypad connected to the microprocessor for operating the thermostat. The first sub-base assembly has at least one contact for connecting a wire lead from at least one wired remote temperature sensor to the first sub-base assembly. The second sub-base assembly has a receiver adapted for wireless communication with at least one wireless remote temperature sensor. The main unit is releasably connectable to the first sub-base assembly in a manner so that when the main unit is connected to the first sub-base assembly the main unit is adapted to receive from the first sub-base assembly information from the at least one wired remote temperature sensor. The main unit is releasably connectable to the second sub-base assembly in a manner so that when the main unit is connected to the second sub-base assembly the main unit is adapted to receive from the second sub-base assembly information from the at least one wireless remote temperature sensor. The method further comprises connecting one of the first and second sub-base assemblies to the HVAC system, and connecting the main unit to said one of the first and second sub-base assemblies.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
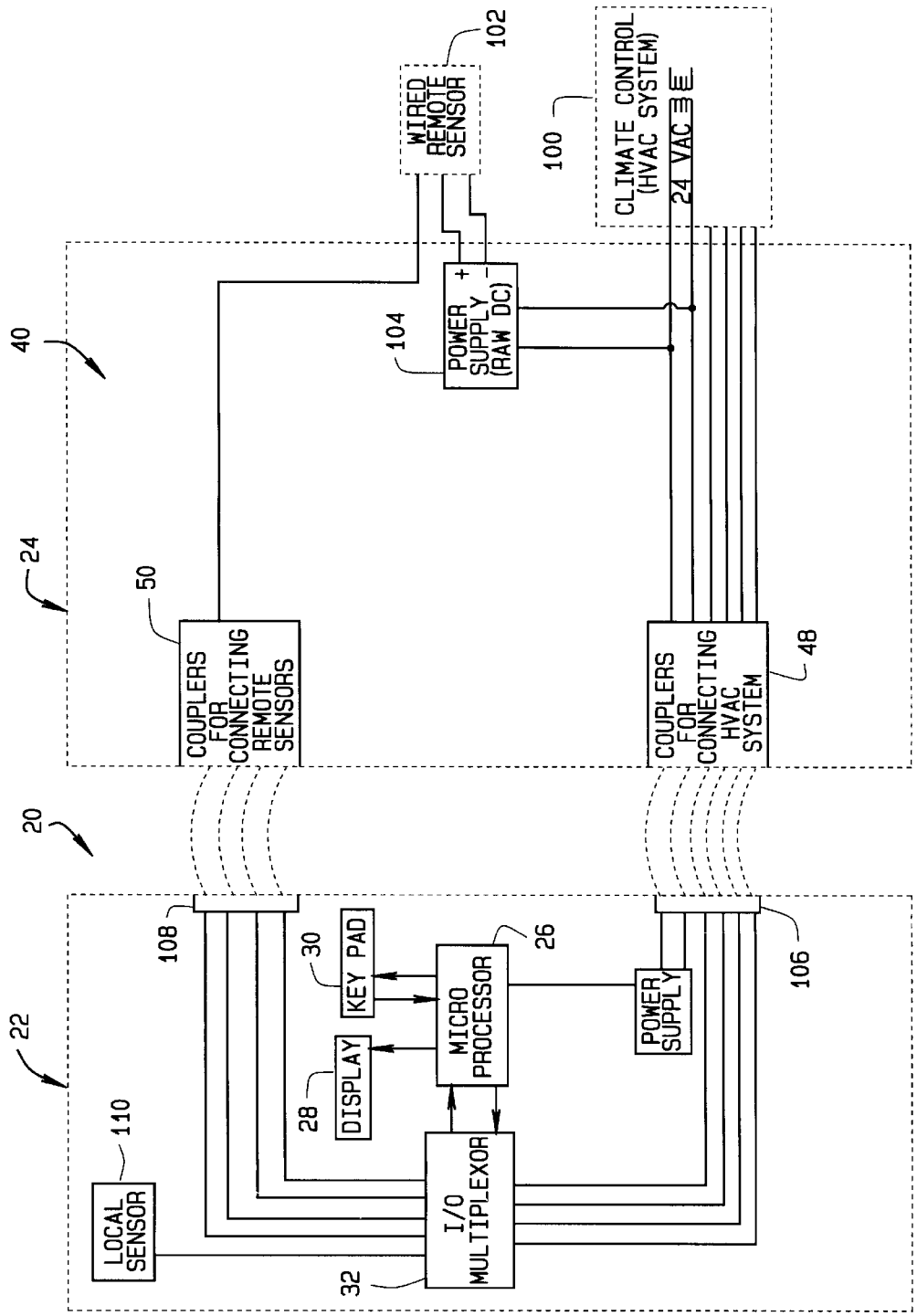
FIG. 1 is a block diagram of a thermostat of the present invention, the thermostat including a main unit and a sub-base comprising a first sub-base assembly.

Referring first to FIG. 1, a thermostat of the present invention is generally indicated by reference numeral 20. The thermostat 20 is preferably a digital, programmable thermostat for operating a climate control system. The thermostat 20 includes a main unit, generally indicated at 22, and a sub-base, generally indicated at 24. As described in greater detail below, the main unit 22 includes components common to different thermostat applications, and the sub-base 24 includes components unique to certain thermostat applications. The main unit 22 has a microprocessor 26 and associated circuitry configured to communicate with any one of a plurality of different sub-bases so that the same type of main unit may be employed for different thermostat applications even if different sub-bases are required.

The main unit 22 preferably also includes a display 28, a keypad 30, and a cover, generally indicated at 32 (shown in FIG. 2), for housing the components of the main unit. The microprocessor 26 is configured for receiving information from at least one remote temperature sensor (discussed below) coupled to the sub-base 24. The microprocessor 26 uses information received from the temperature sensor(s) in conjunction with user inputs received via the keypad 30 to operate the climate control system.

The sub-base 24 includes a housing, generally indicated at 34 (FIG. 2), preferably made of a suitable plastic material.

Figure 2:
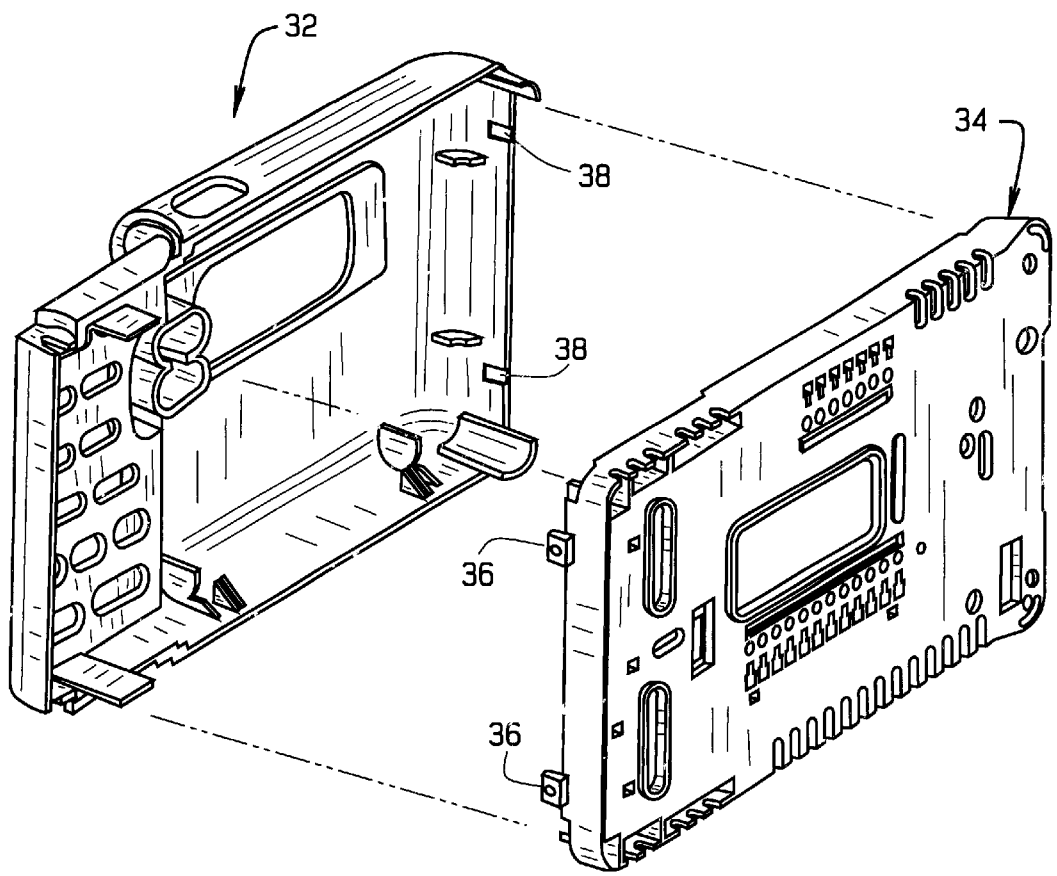
FIG. 2 is an exploded perspective view of a cover of the main unit of FIG. 1 and a housing of the sub-base assembly of FIG. 1.

The housing 34 of the sub-base 24 is shaped and configured for a snap-fit connection to the cover 32 of the main unit 22. As shown in FIG. 2, the housing 34 of the sub-base 24 has a plurality of lugs 36 engageable with a like plurality of recesses 38 in the cover 32 of the main unit 22. The main unit 22 and sub-base 24 further include mateable electrical couplers (not shown) which are adapted to mate with one another when the cover 32 is connected to the housing 34 (i.e., when the lugs 36 engage the recesses 38) to facilitate communication between the electrical components of the main unit and sub-base. Preferably, the couplers of the main unit 22 are conventional pin-type connectors extending rearwardly from the back side of the main unit, and the couplers of the sub-base 24 are conventional sockets adapted for receiving the pin-type connectors. The housing 34 is adapted to be secured to a wall (not shown) via screws or other suitable fasteners.

Figure 3:
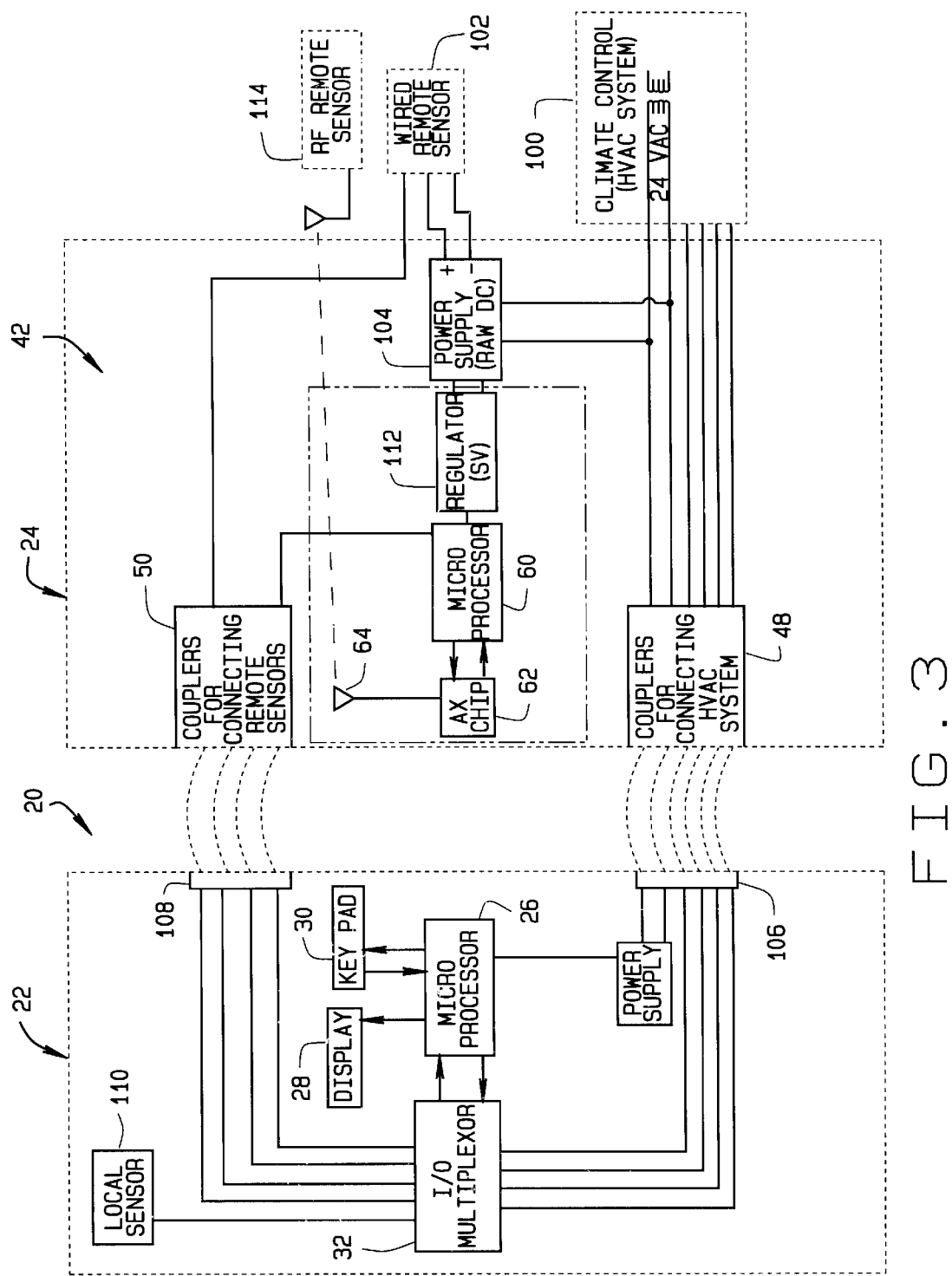
FIG. 3 is a block diagram of a thermostat of the present invention, the thermostat including the same main unit of FIG. 1, but a second sub-base assembly different than the first sub-base assembly.

The electrical components of the sub-base 24 are referred to herein as a sub-base assembly. The sub-base 24 comprises one of at least two different sub-base assemblies. A first possible sub-base assembly 40 is shown in FIG. 1 and a second possible sub-base assembly 42 is shown in FIG. 3. The primary differences between these sub-base assemblies is that the first sub-base assembly 40 is adapted to be connected to one or more remote temperature sensors via one or more wire leads (i.e., it is hard wire connected to the remote temperature sensors) and the second sub-base assembly 42 has a receiver adapted for wireless communication with one or more remote temperature sensors.

FIG. 1 is a block diagram of the main unit 22 connected to the first sub-base assembly 40. The first sub-base assembly 40 includes a first coupler 48 for connecting sub-base 24 to the climate control (HVAC) system 100, a second coupler 50 for connecting sub-base 24 to at least one remote sensor 102, and a power supply 104 for the wired remote sensor 102. The wired remote sensor 102 may be a thermistor or any other suitable sensor. The conventional sockets of couplers 48 and 50 are adapted for mating with the pin-type connectors of the couplers 106 and 108, respectively, of main unit 22. The couplers 106 and 108 are electrically coupled to the micro-processor 26 via an I/O multiplexor 52. With the first sub-base assembly 40 connected to the main unit 22 (i.e., when the pin-type connectors are inserted into the sockets) the microprocessor 26 of the main unit 22 is electrically coupled to the HVAC system 100 and to the wired remote sensor 102. As discussed above, the microprocessor 26 is configured and adapted to control the HVAC system based on information received from the keypad 30 and the wired remote sensor 102. The main unit 22 may also include a local temperature sensor 110. Preferably, the microprocessor 26 is configured and adapted to control the HVAC system 100 based on additional information received from the local temperature sensor 110.

FIG. 3 is a block diagram of the main unit 22 connected to the second sub-base assembly 42. The second sub-base assembly 42 preferably has all of the components of the first sub-base assembly, and also includes a microprocessor 60 having a receiver chip 62, 5V Regulator 112 (connected to power supply 104), an antenna 64 electrically connected to receiver chip 62. Preferably, the receiver chip 62 is a radio frequency (RF) receiver chip for RF communication with at least one remote temperature sensor 114. The microprocessor 60 is electrically coupled to the microprocessor 26 of the main unit 22 via the mating pin-type connections and sockets of coupler 50 and the I/O multiplexer 52. With the second sub-base assembly 42 connected to the main unit 22, the microprocessor 26 of the main unit is electrically coupled to the HVAC system 100 and to the wired remote sensor(s) 102. The microprocessor 26 is configured and adapted to control the HVAC system 100 based on information received from the keypad 30, the wired remote sensor 102, and the wireless remote sensor 114. Although the second sub-base assembly 42 is shown as including a wired-remote sensor 102 and an RF remote sensor 114, it is to be understood that the second sub-base assembly could be configured to employ only wireless remote sensors.

In operation, a user determines whether it is desirable to employ wired temperature sensors, wireless temperature sensors, or a combination thereof. If it is desired to employ only wired temperature sensors, then the user connects the first sub-base assembly 40 to the remote sensor(s) 102 and to the HVAC system 100, and mounts the housing 34 for the first sub-base assembly on a wall. The user then snap connects the cover 32 of the main unit 22 to the housing 34 of the first sub-assembly 40. The main unit 22 and first sub-base assembly 40 are adapted to control the HVAC system 100. If it is desired to employ only wireless temperature sensors or a combination of wireless and wired temperature sensors, then the user connects the second sub-base assembly 42 to the remote sensor(s) 114 and to the HVAC system 100. The housing 34 of the second sub-base assembly 42 is then mounted on a wall. The user then snap connects the cover 32 of the main unit 22 to the housing 34 second sub-assembly 42. The main unit 22 and second sub assembly 42 are adapted to control the HVAC system 100. Thus, the same main unit may be employed regardless of which sub-base assembly is used.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A thermostat adapted to be connected to a climate control system for operating the climate control system, the thermostat comprising a main unit having a microprocessor, a keypad connected to the microprocessor for operating the thermostat, and a sub-base, the sub-base being adapted to communicate with at least one remote temperature sensor and provide information from the at least one remote temperature sensor to the microprocessor, the sub-base comprising one of a first sub-base assembly and a second sub-base assembly, the first sub-base being adapted for connection to the at least one remote temperature sensor via at least one wire lead, the second sub-base assembly having a receiver adapted for wireless communication with the at least one remote temperature sensor, the main unit being releasably connectable to the sub-base in a manner so that when the main unit is connected to the sub-base the main unit is adapted to receive from the sub-base said information from the at least one remote temperature sensor regardless of whether the sub-base constitutes the first sub-base assembly or the second sub-base assembly.

2. A thermostat as set forth in claim 1 wherein the microprocessor is adapted to control operation of the climate control system in accordance with pre-stored instructions and user entered data entered via the keypad.

3. A thermostat as set forth in claim 2 wherein when the main unit is connected to the sub-base, the pre-stored instructions enable the microprocessor to control operation of the climate control system in part based on information communicated from the at least one remote temperature sensor to the microprocessor.

4. A thermostat as set forth in claim 1 wherein the sub-base comprises the first sub-base assembly.

5. A thermostat as set forth in claim 1 wherein the sub-base comprises the second sub-base assembly.

6. A thermostat as set forth in claim 5 wherein the receiver of the second sub-base assembly is a RF receiver for RF communication with the at least one remote temperature sensor.

7. A thermostat as set forth in claim 5 wherein the microprocessor of the main unit comprises a first microprocessor, the second sub-base assembly further comprising a second microprocessor for controlling the receiver.

8. A thermostat as set forth in claim 1 wherein the main unit further includes a local temperature sensor.

9. A method of controlling an HVAC system comprising:

providing a main unit of a thermostat, a first sub-base, and a second sub-base, the main unit having a microprocessor and a keypad connected to the microprocessor for operating the thermostat, the first sub-base assembly being adapted for connection to at least one wired remote temperature sensor via at least one wire lead, the second sub-base assembly having a receiver adapted for wireless communication with at least one wireless remote temperature sensor, the main unit being releasably connectable to the first sub-base assembly in a manner so that when the main unit is connected to the first sub-base assembly the main unit is adapted to receive from the first sub-base assembly information from the at least one wired remote temperature sensor, the main unit being releasably connectable to the second sub-base assembly in a manner so that when the main unit is connected to the second sub-base assembly the main unit is adapted to receive from the second sub-base assembly information from the at least one wireless remote temperature sensor;

connecting one of the first and second sub-base assemblies to the HVAC system;

connecting the main unit to said one of the first and second sub-base assemblies.

10. A method as set forth in claim 9 wherein the step of connecting one of the first and second sub-base assemblies to the HVAC system comprises connecting the first sub-base assembly to the HVAC system.

11. A method as set forth in claim 10 wherein the step of connecting the main unit to said one of the first and second sub-base assemblies comprises connecting the main unit to the first sub-base assembly in a manner to enable the microprocessor to control operation of the HVAC system based at least in part upon information received from the at least one wired remote temperature sensor.

12. A method as set forth in claim 9 wherein the step of connecting one of the first and second sub-base assemblies to the HVAC system comprises connecting the second sub-base assembly to the HVAC system.

13. A method as set forth in claim 12 wherein the step of connecting the main unit to said one of the first and second sub-base assemblies comprises connecting the main unit to the second sub-base assembly in a manner to enable the microprocessor to control operation of the HVAC system based at least in part upon information received from the at least one wireless remote temperature sensor.

14. A method as set forth in claim 9 wherein the receiver of the second sub-base assembly is a RF receiver for RF communication with the at least one wireless remote temperature sensor.

15. A thermostat as set forth in claim 9 wherein the microprocessor of the main unit comprises a first microprocessor, the second sub-base assembly further comprising a second microprocessor for controlling the receiver.

* * * * *